United States Patent
Krishnamurthi

(10) Patent No.: US 11,449,555 B2
(45) Date of Patent: Sep. 20, 2022

(54) CONVERSATIONAL AI BASED ON REAL-TIME CONTEXTUAL INFORMATION FOR AUTONOMOUS VEHICLES

(71) Applicant: GM Cruise Holdings LLC, San Francisco, CA (US)

(72) Inventor: Govindarajan Krishnamurthi, Palo Alto, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 110 days.

(21) Appl. No.: 16/730,155

(22) Filed: Dec. 30, 2019

(65) Prior Publication Data

US 2021/0200811 A1  Jul. 1, 2021

(51) Int. Cl.
| | |
|---|---|
| *G06F 16/9032* | (2019.01) |
| *H04N 7/15* | (2006.01) |
| *G10L 15/26* | (2006.01) |
| *G10L 15/22* | (2006.01) |

(52) U.S. Cl.
CPC ........ *G06F 16/90332* (2019.01); *G10L 15/26* (2013.01); *H04N 7/157* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 2016/0134840 A1* | 5/2016 | McCulloch | G06K 9/00208 348/14.03 |
| 2017/0060839 A1* | 3/2017 | Kawamura | G10L 25/63 |
| 2018/0166076 A1* | 6/2018 | Higuchi | G06F 16/00 |
| 2018/0222490 A1* | 8/2018 | Ishihara | B60W 50/14 |
| 2018/0277108 A1* | 9/2018 | Badr | G06N 3/006 |
| 2019/0018364 A1* | 1/2019 | Kim | H04M 3/567 |
| 2019/0035394 A1* | 1/2019 | Tsai | G06F 16/24575 |
| 2019/0198007 A1* | 6/2019 | Guo | B25J 9/0003 |
| 2019/0206401 A1* | 7/2019 | Liu | G06K 9/00664 |
| 2019/0255995 A1* | 8/2019 | Friedman | B60W 50/14 |
| 2019/0289264 A1* | 9/2019 | Hachisuka | H04N 5/2628 |
| 2019/0319898 A1* | 10/2019 | Scanlon | G06N 20/00 |
| 2019/0355178 A1* | 11/2019 | Hermina Martinez | H04N 7/142 |
| 2020/0349666 A1* | 11/2020 | Hodge | G06F 21/36 |

* cited by examiner

*Primary Examiner* — Stella L. Woo
(74) *Attorney, Agent, or Firm* — Polsinelli, PC

(57) ABSTRACT

The present technology is effective to receive a list of topics for discussion, initiate a conversation with a passenger of an autonomous vehicle, receive sensor data from sensors of the autonomous vehicle; determine, based upon sensor data received from the autonomous vehicle and the first topic, contextual information to present in the conversation with the passenger; and present the contextual information in the conversation to the passenger. The list of topics may be determined by a user. The conversation may include at least a first topic. The first topic may be included in the list of topics for discussion.

21 Claims, 4 Drawing Sheets

CONVERSATIONAL AI BASED ON REAL-TIME CONTEXTUAL INFORMATION FOR AUTONOMOUS VEHICLES

TECHNICAL FIELD

The present technology pertains to a conversational artificial intelligence for autonomous vehicles and more specifically pertains to a conversational artificial intelligence utilizing real-time contextual information gathered by sensors of autonomous vehicles in conversation.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Passengers in a car ride rely on other passengers or a human driver for entertainment and conversation. In an autonomous vehicle, the passenger may be the only person in the vehicle; thus the passenger may not have any other person to converse with.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
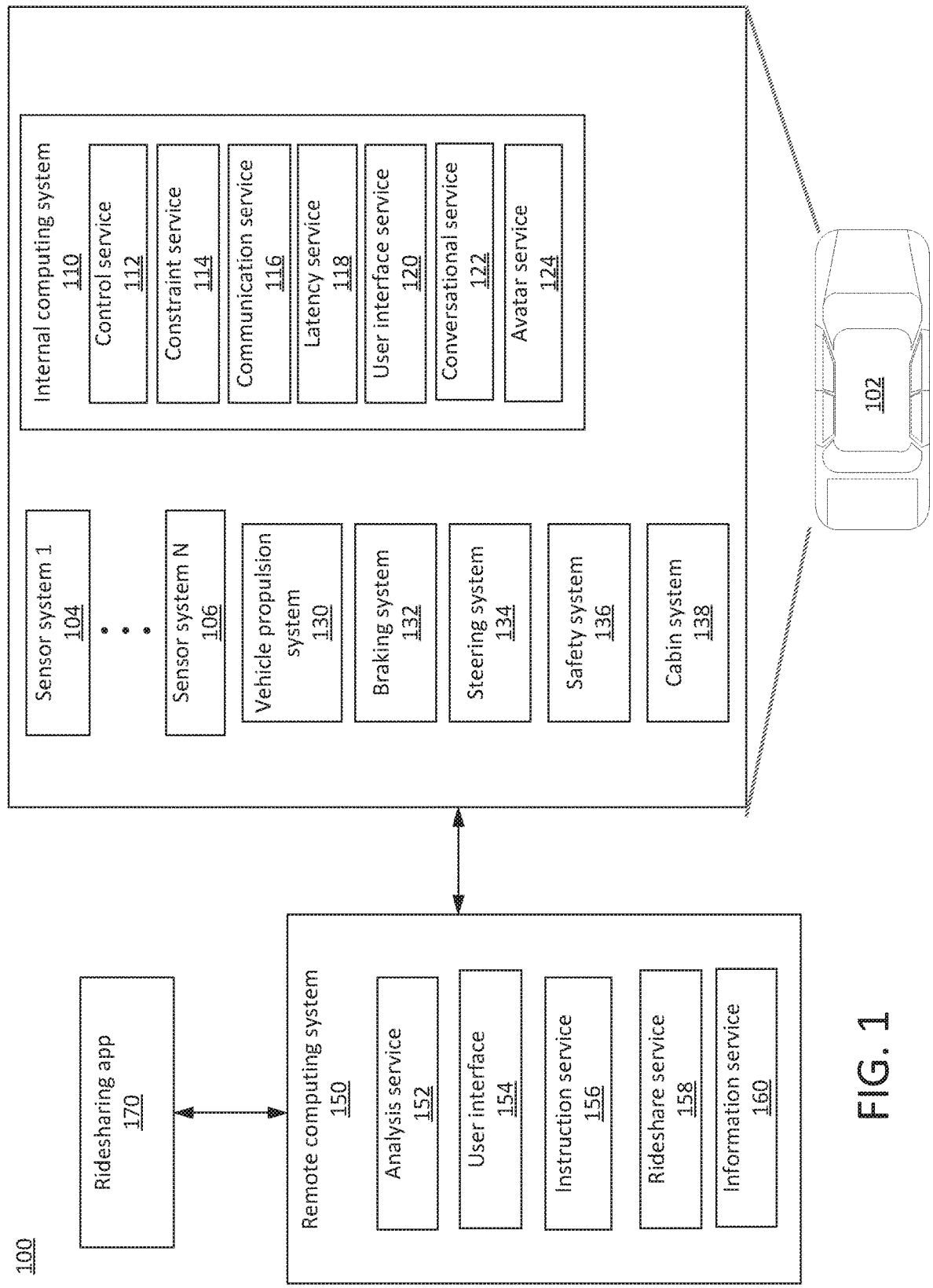
FIG. 1 shows an example system for operating an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a conversational artificial intelligence (AI) based on real-time contextual information gathered by sensors of an autonomous vehicle. Some AIs are currently able to converse with users for limited purposes such as to disambiguate a request, r to inform the user of the AI's progress in fulfilling the request, or to gather more information needed to handle a request. However, AI is not currently used to carry out general conversations for a period of time. Additionally, an autonomous vehicle has access to more contextual information regarding the user's surrounding environment than most other conversational AI based on sensor data gathered by sensors of the autonomous vehicle. For example, the autonomous vehicle may determine landmarks based on camera sensors on the autonomous vehicle. Thus, an autonomous vehicle can offer more topics of conversation and can offer more fluid conversation by relying on sensor data to determine contextual information regarding the user's surroundings.

By utilizing sensor data to determine contextualized information, the autonomous vehicle may develop an AI, hologram, and/or other avatar to converse with passengers of the autonomous vehicle. Furthermore, the autonomous vehicle may then interact with a database or a remote computing system to determine additional information about objects detected by the sensor systems of the autonomous vehicle. For example, the sensors of the autonomous vehicle may detect a popular landmark and the autonomous vehicle may then communicate with a database to determine when the landmark was built. The autonomous vehicle may then converse, through the AI, hologram, and/or avatar, with the passenger to present when the landmark was built.

Furthermore, different passengers may generally be interested in different topics. Thus, the autonomous vehicle may also determine these different topics and communicate the contextualized information about each topic individually to each passenger.

In some scenarios, the passenger may be a child travelling alone without a parent or guardian. Thus, the parent or guardian who is not present may worry about the child. Similarly, the child may feel worried or uncomfortable without his or her parent present. Thus, the autonomous vehicle may, with the consent of the parent or guardian, generate the AI, hologram, and/or other avatar in the likeness of the parent or guardian, which may provide comfort and/or confidence to the child. Furthermore, the autonomous vehicle may, with the consent of the parent or guardian, use in-cabin sensors to provide a live video feed of the child passenger to the parent or guardian, so that the parent or guardian can observe that child as the child travels alone.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, audio systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions, accessing a database or information stored on the remote computing system 150, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The internal computing system 110 can also include a conversational service 122 to initiate conversation or communication with the human passenger. The conversational service 122 may utilize the cabin system 138 to audibly output information to the human passenger of the autonomous vehicle 102. Furthermore, the conversational service 122 may utilize the sensor systems 104-106, such as a microphone for spoken languages or a camera for non-spoken communication (e.g. sign language or a passenger pointing to identify a direction), to receive information from the passenger.

The internal computing system 110 can also include an avatar service 124 to generate an image, avatar, and/or hologram. The avatar service 124 provides a visual method of presenting information. Thus, the conversational service 122 and the avatar service 124 may in parallel to both audibly and visually present information to the human passenger. The avatar service 124 may be coupled with display hardware in cabin of the autonomous vehicle 102. The display hardware may include one or more in-car displays that project the avatar thereon and/or therethrough. In some embodiments, the avatar service 124 displays an image or avatar on a window of the autonomous vehicle 102. In some embodiments, the avatar service 124 generates an interactive hologram in the cabin of the autonomous vehicle 102.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, access to a database or information stored on the remote computing system 150, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The remote computing system 150 can also include an information service 160 that may obtain, store, and communicate information about various objects and landmarks. For example, the information service 160 may be a database that contains details about landmarks and buildings. Similarly, the information service 160 may contain passenger information in passenger profiles that are associated with the respective passenger. For example, the passenger profile may include topics of interest for the respective passenger.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
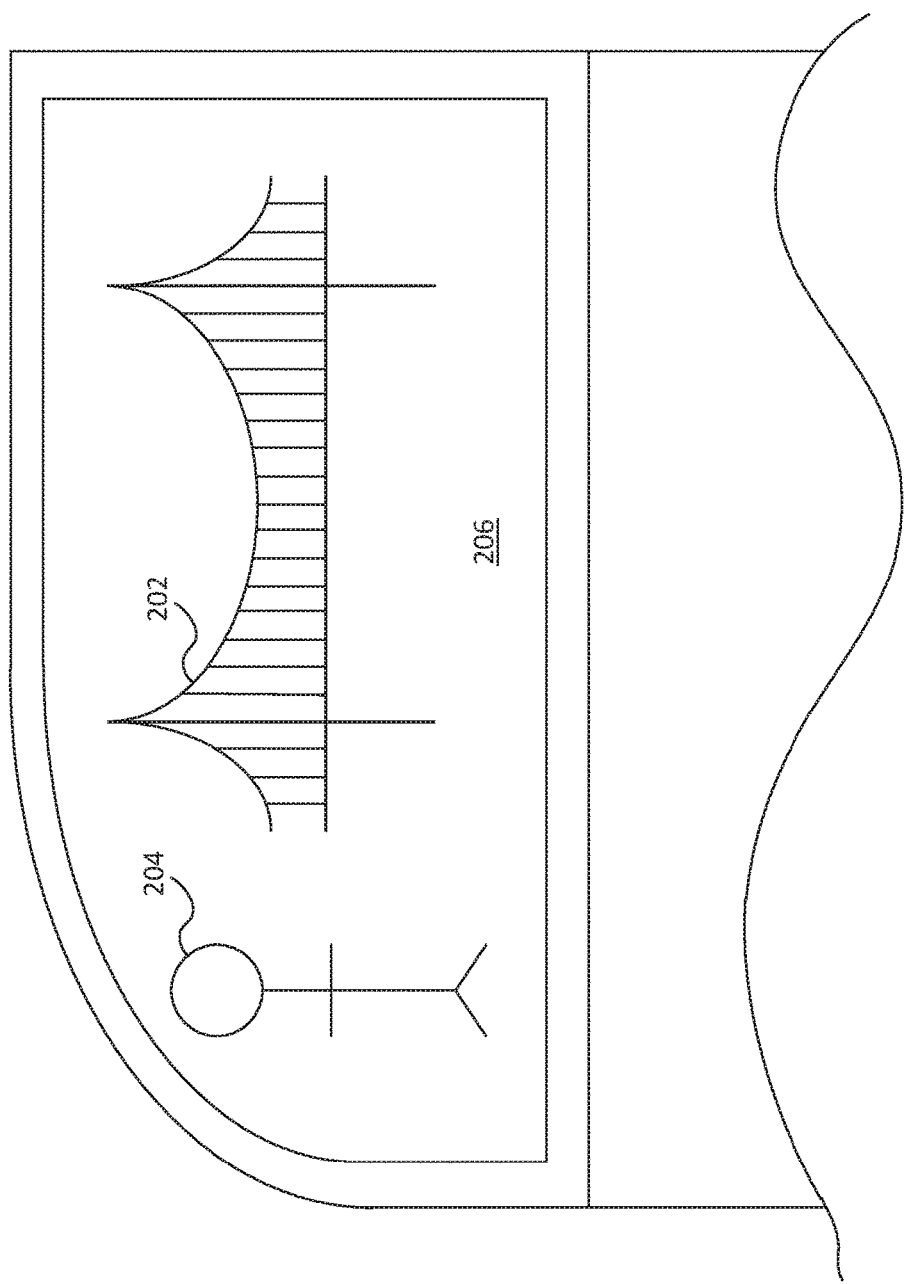
FIG. 2 an example environment of an autonomous vehicle presenting contextualized information in accordance with some aspects of the present technology.

FIG. 2 an example environment 200 of the autonomous vehicle 102 presenting contextualized information in accordance with some aspects of the present technology. The autonomous vehicle 102 may drive by objects 202, such landmarks, buildings, points of interests, animals, and/or other detected objects during a journey with the passenger. The autonomous vehicle 102 may then present the information about the object 202. In some embodiments, the object 202 may be based on sensor data detected in real time. Thus, the information about the object 202 would be real-time, contextualized information. As shown, in some embodiments, the autonomous vehicle 102 may present the information through a hologram or avatar 204. Similarly, in some embodiments, the presentation of information may occur on a display or window 206. As discussed above, the avatar service 124 may include an in-car display, on which the avatar 204 presents information. In some embodiments, the in-car display may be the window to allow the avatar 204 to point and visually reference objects 202 during conversations with the passenger.

Figure 3:
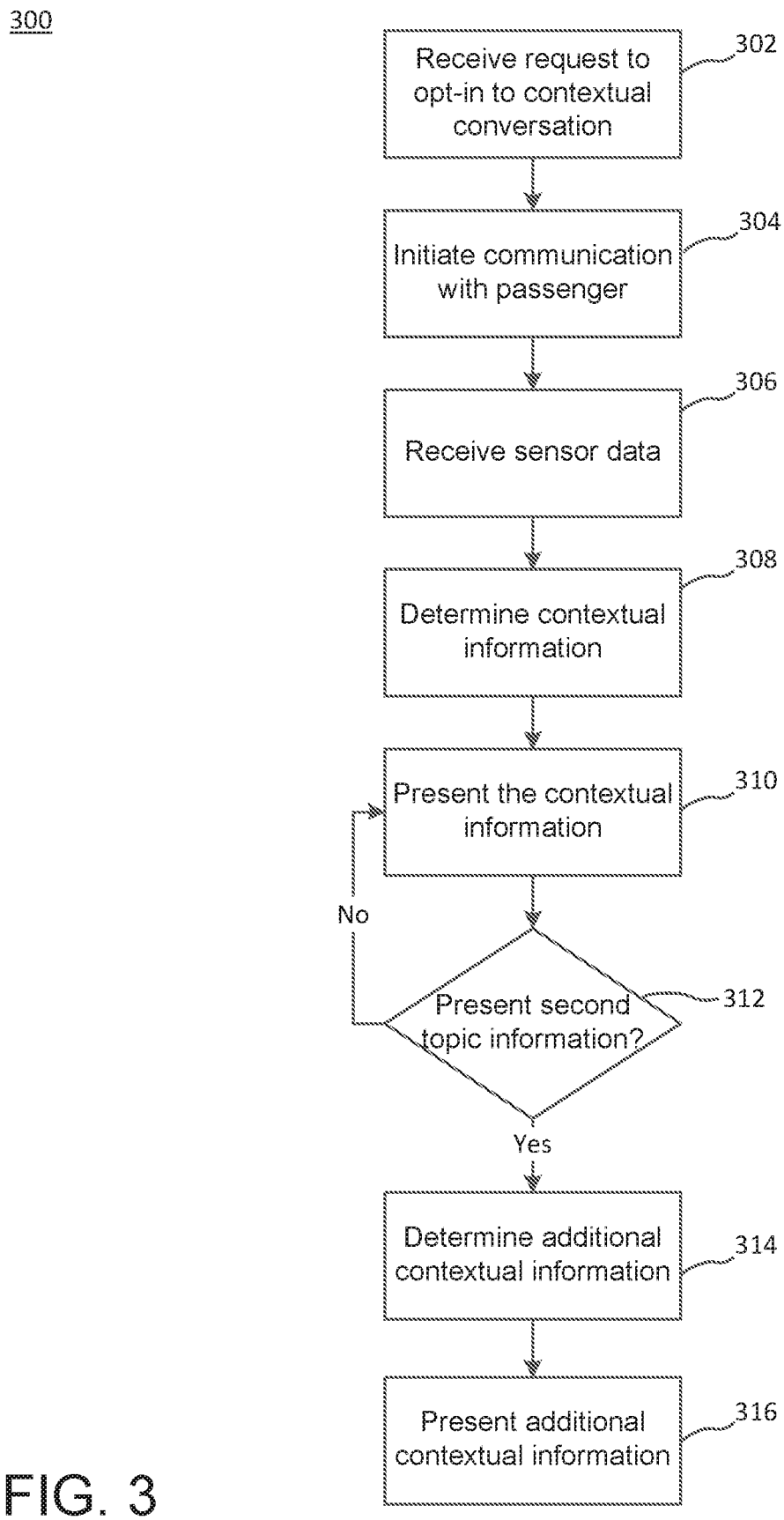
FIG. 3 is a flow diagram of an example process for presenting contextualized information in accordance with some aspects of the present technology.

FIG. 3 is a flow diagram of an example process 300 for presenting contextualized information in accordance with some aspects of the present technology. While the process 300 may be implemented by various systems, this disclosure implements the process 300 through the internal computing system 110 for clarity and discussion purposes.

The process 300 begins at step 302. At step 302, the internal computing system 110 receives a request to opt-in or initiate contextual conversation with the passenger. More specifically, the internal computing system 110 may receive, through the user interface service 120, a request to initiate contextual conversation. In some embodiments, the remote computing system 150 may receive the request through the ridesharing application 170 associated with a mobile device of a user. The internal computing system 110 may then receive the request from the remote computing system 150 through the communication service 116. Thus, the internal computing system 110 may receive the request remotely from the user. The request may also include a list of topics for discussion, which is determined by a user or the passenger. The list of topics for discussion may indicate topics that the passenger is interested in. For example, the passenger may indicate an interest in architecture by including architecture in the list.

In some embodiments, the list of topics for discussion may be found in a passenger profile associated with the passenger, which may be accessed using the information service 160 on the remote computing system 150. For example, the passenger may indicate in the passenger profile an interest in architecture. Thus, the internal computing system 110 may access the internal computing system 110 to determine the list of topics for discussion with the passenger. It is further contemplated that the list of topics may also be developed through previous conversations with the passenger on previous journeys. Thus, the list of topics may evolve or change over time without explicit input from the passenger.

In some embodiments, the request may be received from a mobile device of a user associated with the passenger. For example, the user may be a parent or guardian of the passenger who is familiar with the interests of the child passenger. Thus, the parent user may send from their phone, via the ridesharing application 170, the request to the autonomous vehicle 102 including the list of topics. Similarly, in some embodiments, the parent user may also send, with the request, an image or live video feed of the user captured using sensors, so that the avatar service 124 may use the image or live video feed to generate an avatar or hologram for the passenger to observe. It is further contemplated that the image of the user may simply be captured by the sensor systems 104-106 of the autonomous vehicle 102 when the user is riding along with the passenger.

In some embodiments, the internal computing system 110 may then verify and authenticate that the user is associated with the passenger. After verifying and authenticating that the user is indeed associated with the passenger, the internal computing system may also receive, from sensors in the cabin of the autonomous vehicle, live video feed of the passenger. Then, the internal computing system 110 may send, to the mobile device of the user, the live video feed of the passenger, so that the parent user may watch the child passenger during the ride. Similarly, live video feed of sensor systems 104-106 of the autonomous vehicle 102 may be streamed to the mobile device of the user prior to the child passenger boarding the autonomous vehicle 102. Thus, in some scenarios, the user may assist the autonomous vehicle 102 in identifying the child passenger to be picked up by the autonomous vehicle 102.

In some embodiments, the internal computing system 110 may, via sensors inside the cabin of the autonomous vehicle 102, detect that the passenger is bored. More specifically, cameras inside of the cabin of the autonomous vehicle 102 may observe the face of the passenger and determine that the passenger is uninterested or bored. Accordingly, instead of receiving a request from the passenger or user, the internal computing system 110 may determine that conversation or communication should be initiated with the passenger based upon the detected bored state.

Next, at step 304, the internal computing system 110 initiates communication or conversation with the passenger. More specifically, the internal computing system 110 initiates a conversation about a first topic included in the list of topics for discussion. For example, the internal computing system 110 may output, via the cabin system 138, "Good afternoon passenger. Would you like to talk about architecture?" In some scenarios, the list of topics for discussion may include similar topics, such as architecture and civil engineering. Thus, the internal computing system 110 may group the topics and converse generally about multiple topics together.

At step 306, the internal computing system 110 receives sensor data obtained by the sensor systems 104-106 of the autonomous vehicle 102. The sensor systems 104-106 may include cameras that obtain image sensor data, such as images of various objects 202 in an environment around the autonomous vehicle 102. The internal computing system would then detect objects 202 in the sensor data. For example, the camera system may capture an image or video of the Golden Gate Bridge. The internal computing system 110 would then receive the image or video of the Golden Gate Bridge as sensor data and detect the Golden Gate Bridge in the image or video.

At step 308, the internal computing system 110 determines contextual information. More specifically, the internal computing system 110 determines contextual information based upon the sensor data received from the sensor systems 104-106 of the autonomous vehicle and at least the first topic for discussion. Furthermore, the internal computing system 110 may, based on detected objects 202 in the sensor data, communicate, using the communication service 116, with the information system 160 of the remote computing system 150 to determine details about the detected objects 202. For example, the internal computing system 110 may access a landmark database on the remote computing system 150 to determine the architect behind the Golden Gate Bridge. By using the live, context-based sensor data and the topics that interest the passenger, the internal computing system 110 may determine contextual information to present to the passenger. In some embodiments, the information system 160 may be located on a cloud computing system.

Then, at step 310, the internal computing system 110 presents the contextual information in the conversation with the passenger. As discussed briefly above, the internal computing system 110 may use the cabin system 138 to communicate with the passenger. In further detail now, the cabin system 138 may include an audio system so that the internal computing system 110 may audibly present the contextual information to the passenger. For example, the internal computing system may output, via the cabin system 138, "To the right is the Golden Gate Bridge. It was built by architect Joseph Strauss."

In some embodiments, the cabin system may be configured to generate the hologram or avatar 204 in the cabin of the autonomous vehicle 102. The hologram or avatar 204 provides a visual method of presenting contextual information. For example, the avatar 204 may also interact with or otherwise include a text-box or subtitles, such that the text-box or subtitles allow the passenger to read the contextual information. Furthermore, the hologram or avatar 204 may be rendered differently based on each passenger. For example, the passenger may choose a different persona for the hologram or avatar 204 so that the passenger feels that they like or relate to the chosen persona.

In some embodiments, the hologram or avatar 204 may be generated based upon the image of the user. Similarly, in some embodiments, the image of the user is a portion of a live video feed of the user, such that the hologram 204 may replicate the live video feed of the user, so that the passenger is able to communicate with the user.

In some of these embodiments, the hologram or avatar 204 may be based upon the image received from the parent user in step 302. By generating the hologram or avatar 204 based upon the parent user, the internal computing system 110 may help comfort child passengers who are uncomfortable riding without a parent or guardian present.

It is further contemplated that the hologram or avatar 204 may interact with multiple passengers. Similarly, multiple holograms or avatars 204 may be generated for multiple passengers. Thus, each of the multiple holograms or avatars 204 may be generated with different appearances and allow for comfort with different passengers.

At step 312, the internal computing system 110 determines whether to present information about a second topic. The second topic may be a topic in the list of topics for discussion. In some embodiments, the second topic may also be determined based on a wide range of factors including, but not limited to, frequency of reference, pitch of voice when discussing the topic, etc.

In some embodiments, the internal computing system 110 may determine to present information about the second topic by detecting the second topic in the conversation. In other words, the internal computing system 110 may detect, in the conversation with the passenger, words or phrases associated with the second topic. For example, the passenger may have indicated an interest in color theory, in addition to architecture. The passenger may then have asked why the Golden Gate Bridge is orange and not golden, to which the internal computing system 110 may detect the words or phrases associated with color theory (i.e. orange and golden). The internal computing system 110 may then determine to present information about the second topic (i.e. color theory).

In some embodiments, the internal computing system 110 may receive a command from the user or passenger. The command may indicate and/or be effective to initiate a change of the conversation from the first topic to the second topic.

If the internal computing system 110 determines not to present information about a second topic, the process 300 returns to step 310, in which the internal computing system 110 continues to present the contextual information in the conversation with the passenger.

If the internal computing system 110 determines to present information about the second topic, the process 300 continues to step 314. At step 314, the internal computing system 110 determines additional contextual information. Similar to the contextual information determined at step 308, the additional contextual information is based upon the sensor data and the second topic. Furthermore, the internal computing system 110 may again communicate with the remote computing system 150 to determine additional details about the detected objects 202. Continuing the color theory and architecture example above, the internal computing system 110 may then access the database on the remote computing system 150 to determine the reason behind the Golden Gate Bridge being orange.

At step 316, the internal computing system 110 then presents the additional contextual information in the conversation with the passenger. Like the presentation in step 310, the internal computing system 110 may present the additional contextual information using the cabin system 138. Again, continuing the Golden Gate Bridge example above, the internal computing system 110 may cause the hologram 204 to state "The Golden Gate Bridge is orange because designer Irving Morrow felt the color orange, rather than the usual gray, complemented the environment around the Bridge."

It is further contemplated that the process 300 may stop at any step 302-316, if the internal computing system 110 receives a command to stop.

Figure 4:
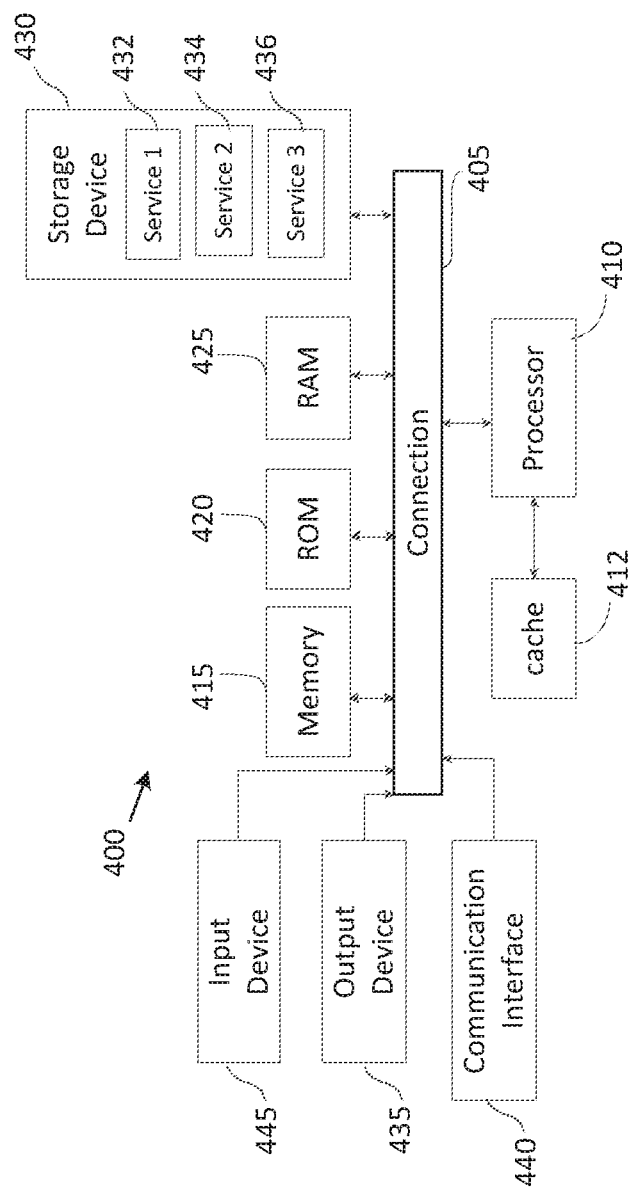
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving a list of topics for discussion, the list determined by a user, wherein the user is associated with a ridesharing application, and wherein the list of topics for discussion is received from the ridesharing application;
   detecting, based on data received from in-cabin sensors of an autonomous vehicle, that a passenger of the autonomous vehicle is bored;
   initiating a conversation with the passenger of the autonomous vehicle through an interactive hologram generated by the autonomous vehicle, the conversation including at least a first topic, the first topic included in the list of topics for discussion, wherein the conversation is initiated in response to detecting that the passenger of the autonomous vehicle is bored;
   receiving sensor data from sensors of the autonomous vehicle;
   determining, based upon sensor data received from the autonomous vehicle and the first topic, contextual information to present in the conversation with the passenger; and
   presenting the contextual information in the conversation to the passenger through the interactive hologram, wherein the contextual information is based on a location of the autonomous vehicle.

2. The method of claim 1, further comprising:
   determining, based on a reaction of the passenger to the conversation, to present information about a second topic;
   determining, based upon sensor data received from the autonomous vehicle and the second topic, additional contextual information to present in the conversation with the passenger; and
   presenting the additional contextual information in the conversation to the passenger.

3. The method of claim 1, further comprising:
   receiving a command from the user, the command effective to initiate a change of the conversation from the first topic to a second topic, the second topic included in the list of topics for discussion;
   determining, based upon sensor data received from the autonomous vehicle and the second topic, additional contextual information to present in the conversation with the passenger; and
   presenting the additional contextual information in the conversation to the passenger.

4. The method of claim 1, further comprising:
   receiving an image of the user; and
   generating an avatar as the interactive hologram, within a cabin of the autonomous vehicle, for a passenger to observe, wherein the avatar is based upon the image of the user.

5. The method of claim 4, wherein the image of the user is captured using sensors of a mobile device of the user.

6. The method of claim 4, further comprising:
   receiving, from sensors in the cabin of the autonomous vehicle, live video feed of the passenger; and
   sending, to a mobile device of the user, the live video feed of the passenger.

7. The method of claim 4, wherein the image of the user is a portion of a live video feed of the user and the avatar replicates the live video feed.

8. The method of claim 1, wherein the interactive hologram is one of a plurality of interactive holograms, wherein the passenger is one of a plurality of passengers, and wherein each interactive hologram is configured differently for a respective passenger of the plurality of passengers.

9. A system comprising:
   at least one processor; and
   at least one memory storing computer-readable instructions that, when executed by the at least one processor, causes the at least one processor to:
   receive a list of topics for discussion, the list determined by a user, wherein the user is associated with a ridesharing application, and wherein the list of topics for discussion is received from the ridesharing application;
   detect, based on data received from in-cabin sensors of an autonomous vehicle, that a passenger of the autonomous vehicle is bored;
   initiate a conversation with the passenger of the autonomous vehicle through an interactive hologram generated by the autonomous vehicle, the conversation including at least a first topic, the first topic included in the list of topics for discussion, wherein the conversation is initiated in response to detecting that the passenger of the autonomous vehicle is bored;
   receive sensor data from sensors of the autonomous vehicle;
   determine, based upon sensor data received from the autonomous vehicle and the first topic, contextual information to present in the conversation with the passenger; and
   present the contextual information in the conversation to the passenger through the interactive hologram, wherein the contextual information is based on a location of the autonomous vehicle.

10. The system of claim 9, wherein the instructions further cause the at least one processor to:
- determining, based on a reaction of the passenger to the conversation with, to present information about a second topic;
- determine, based upon sensor data received from the autonomous vehicle and the second topic, additional contextual information to present in the conversation with the passenger; and
- present the additional contextual information in the conversation to the passenger.

11. The system of claim 9, wherein the instructions further cause the at least one processor to:
- receive a command from the user, the command effective to initiate a change of the conversation from the first topic to a second topic, the second topic included in the list of topics for discussion;
- determine, based upon sensor data received from the autonomous vehicle and the second topic, additional contextual information to present in the conversation with the passenger; and
- present the additional contextual information in the conversation to the passenger.

12. The system of claim 9, wherein the instructions further cause the at least one processor to:
- receive an image of the user; and
- generate an avatar as the interactive hologram, within a cabin of the autonomous vehicle, for a passenger to observe, wherein the avatar is based upon the image of the user.

13. The system of claim 12, wherein the image of the user is captured using sensors of a mobile device of the user.

14. The system of claim 12, wherein the instructions further cause the at least one processor to:
- receive, from sensors in the cabin of the autonomous vehicle, live video feed of the passenger; and
- send, to a mobile device of the user, the live video feed of the passenger.

15. The system of claim 12, wherein the image of the user is a portion of a live video feed of the user and the avatar replicates the live video feed.

16. A non-transitory computer readable medium comprising instructions, the instructions, when executed by at least one processor, cause the at least one processor to:
- receive a list of topics for discussion, the list determined by a user, wherein the user is associated with a ridesharing application, and wherein the list of topics for discussion is received from the ridesharing application;
- detect, based on data received from in-cabin sensors of an autonomous vehicle, that a passenger of the autonomous vehicle is bored;
- initiate a conversation with the passenger of the autonomous vehicle through an interactive hologram generated by the autonomous vehicle, the conversation including at least a first topic, the first topic included in the list of topics for discussion, wherein the conversation is initiated in response to detecting that the passenger of the autonomous vehicle is bored;
- receive sensor data from sensors of the autonomous vehicle;
- determine, based upon sensor data received from the autonomous vehicle and the first topic, contextual information to present in the conversation with the passenger; and
- present the contextual information in the conversation to the passenger through the interactive hologram, wherein the contextual information is based on a location of the autonomous vehicle.

17. The non-transitory computer readable medium of claim 16, wherein the instructions further cause the at least one processor to:
- determining, based on a reaction of the passenger to the conversation with, to present information about a second topic;
- determine, based upon sensor data received from the autonomous vehicle and the second topic, additional contextual information to present in the conversation with the passenger; and
- present the additional contextual information in the conversation to the passenger.

18. The non-transitory computer readable medium of claim 16, wherein the instructions further cause the at least one processor to:
- receive a command from the user, the command effective to initiate a change of the conversation from the first topic to a second topic, the second topic included in the list of topics for discussion;
- determine, based upon sensor data received from the autonomous vehicle and the second topic, additional contextual information to present in the conversation with the passenger; and
- present the additional contextual information in the conversation to the passenger.

19. The non-transitory computer readable medium of claim 16, wherein the instructions further cause the at least one processor to:
- receive an image of the user; and
- generate an avatar, within a cabin of the autonomous vehicle, for a passenger to observe, wherein the avatar is based upon the image of the user.

20. The non-transitory computer readable medium of claim 19, wherein the image of the user is captured using sensors of a mobile device of the user.

21. The non-transitory computer readable medium of claim 19, wherein the instructions further cause the at least one processor to:
- receive, from sensors in the cabin of the autonomous vehicle, live video feed of the passenger; and
- send, to a mobile device of the user, the live video feed of the passenger.

* * * * *